(12) United States Patent
Nooner et al.

(10) Patent No.: US 11,554,802 B2
(45) Date of Patent: Jan. 17, 2023

(54) DOLLY

(71) Applicant: MIDWEST INNOVATIVE PRODUCTS, LLC, Joliet, IL (US)

(72) Inventors: Bryan Nooner, Frankfort, IL (US); Robert Zajeski, Homer Glen, IL (US)

(73) Assignee: Midwest Innovative Products, Joliet, IL (US)

( * ) Notice: Subject to any disclaimer, the term of this patent is extended or adjusted under 35 U.S.C. 154(b) by 115 days.

(21) Appl. No.: 17/223,656

(22) Filed: Apr. 6, 2021

(65) Prior Publication Data

US 2021/0331730 A1 Oct. 28, 2021

Related U.S. Application Data

(60) Provisional application No. 63/015,745, filed on Apr. 27, 2020.

(51) Int. Cl.
| | |
|---|---|
| *B62B 5/00* | (2006.01) |
| *B62B 3/02* | (2006.01) |
| *B62B 3/00* | (2006.01) |
| *B62B 3/10* | (2006.01) |

(52) U.S. Cl.
CPC ............ *B62B 5/0093* (2013.01); *B62B 3/008* (2013.01); *B62B 3/02* (2013.01); *B62B 3/10* (2013.01); *B62B 2202/80* (2013.01)

(58) Field of Classification Search
CPC ......... B62B 5/0093; B62B 3/008; B62B 3/02; B62B 3/10; B62B 2202/80
See application file for complete search history.

(56) References Cited

U.S. PATENT DOCUMENTS

| | | | |
|---|---|---|---|
| 1,300,533 A | | 4/1919 | Wessinger |
| 2,472,952 A | * | 6/1949 | Lennard ............... B62B 5/0083 |
| | | | 280/35 |
| 2,763,491 A | | 9/1956 | Shafer, Jr. |
| 2,788,220 A | | 4/1957 | Christensen |

(Continued)

FOREIGN PATENT DOCUMENTS

| | | |
|---|---|---|
| CA | 2258380 C | 7/1999 |
| CN | 204447217 U | 7/2015 |

(Continued)

OTHER PUBLICATIONS

European Patent Office, Communication with extended European search report in Application No. 18928900.2, dated Sep. 28, 2020 (7 pages).

(Continued)

*Primary Examiner* — Erez Gurari
(74) *Attorney, Agent, or Firm* — McAndrews, Held & Malloy, Ltd.

(57) ABSTRACT

A dolly includes a first skate, a second skate, and a rod connected to the skates. The first skate is connected to a plurality of wheels and has a receiving region. The second skate is connected to a plurality of wheels and has a receiving region. The second skate includes an outer lateral surface having an aperture. The rod is connected to the first skate and the second skate via the respective receiving regions of the respective skates. The rod is configured to extend through the aperture such that a portion of the rod extends outwardly from the outer lateral surface of the second skate.

18 Claims, 10 Drawing Sheets

(56) References Cited

U.S. PATENT DOCUMENTS

| | | | |
|---|---|---|---|
| 3,061,327 A | 10/1962 | Ensinger | |
| 3,215,382 A | 11/1965 | Stein | |
| 3,331,613 A | 7/1967 | Popelka | |
| 3,488,062 A | 1/1970 | Walda | |
| 3,522,951 A | 8/1970 | Tyson | |
| 3,552,761 A * | 1/1971 | Sjoblom | B62B 3/025 |
| | | | 280/42 |
| 3,775,783 A | 12/1973 | Miller | |
| 4,166,638 A | 9/1979 | De Prado | |
| 4,178,006 A | 12/1979 | Johnson | |
| D286,255 S | 10/1986 | Gage | |
| 4,801,152 A | 1/1989 | Elliott | |
| 4,921,264 A | 5/1990 | Duffy | |
| 5,018,930 A | 5/1991 | Hardin | |
| 5,249,823 A | 10/1993 | McCoy | |
| 5,299,817 A | 4/1994 | Chang | |
| 5,486,014 A | 1/1996 | Hough | |
| 5,599,031 A | 2/1997 | Hodges | |
| 5,707,068 A | 1/1998 | Bradfield | |
| 5,779,252 A | 7/1998 | Bolton, Jr. | |
| 5,855,385 A | 1/1999 | Hambsch | |
| 5,863,053 A | 1/1999 | Berry | |
| 5,938,217 A * | 8/1999 | Wintz | B62B 3/008 |
| | | | 414/427 |
| D415,868 S | 10/1999 | Hewitt | |
| 6,095,533 A * | 8/2000 | Balolia | B60T 1/14 |
| | | | 188/19 |
| 6,109,625 A * | 8/2000 | Hewitt | F16M 11/22 |
| | | | 280/43.24 |
| 6,203,031 B1 | 3/2001 | Leverington | |
| 6,206,385 B1 | 3/2001 | Kern | |
| 6,371,496 B1 | 4/2002 | Balolia | |
| 6,371,497 B1 | 4/2002 | Scire | |
| 6,783,147 B1 | 8/2004 | Green, Sr. | |
| 6,824,150 B2 | 11/2004 | Simione | |
| 7,036,833 B1 | 5/2006 | Berna | |
| 7,213,820 B2 * | 5/2007 | Drummond | B60B 33/0005 |
| | | | 280/79.11 |
| 7,300,063 B1 * | 11/2007 | Prizmich | B62B 5/0083 |
| | | | 280/47.15 |
| D594,622 S | 6/2009 | Kissun | |
| 7,762,198 B2 | 7/2010 | Rasmusson | |
| 7,854,435 B2 | 12/2010 | Campbell | |
| 8,002,510 B2 | 8/2011 | Williams | |
| 8,025,299 B2 * | 9/2011 | Hiltz | B25H 5/00 |
| | | | 280/32.6 |
| 8,850,656 B2 | 10/2014 | Bernal | |
| 8,876,145 B1 | 11/2014 | Bernal | |
| 9,010,798 B2 * | 4/2015 | Buttazzoni | B62B 3/00 |
| | | | 280/638 |
| 9,027,942 B2 | 5/2015 | Hasegawa | |
| 9,364,093 B2 * | 6/2016 | Williams | A47C 7/62 |
| 9,409,585 B2 | 8/2016 | Buttazzoni | |
| 9,522,763 B2 | 12/2016 | Roman | |
| 9,796,568 B1 * | 10/2017 | Gonzales | F16M 11/32 |
| 10,053,129 B1 * | 8/2018 | Turner, Jr. | B62B 5/0083 |
| 11,052,879 B2 * | 7/2021 | Houle | B60S 9/18 |
| 2003/0098552 A1 | 5/2003 | Hsiao | |
| 2004/0227316 A1 * | 11/2004 | Drummond | B60B 33/0023 |
| | | | 280/79.11 |
| 2007/0210545 A1 | 9/2007 | Klotz | |
| 2007/0222165 A1 | 9/2007 | Hope | |
| 2010/0038870 A1 * | 2/2010 | Hiltz | B62B 5/0083 |
| | | | 280/32.6 |
| 2012/0126085 A1 * | 5/2012 | Johnson | A47C 7/002 |
| | | | 248/346.03 |
| 2013/0154216 A1 * | 6/2013 | Paulk, Sr. | B62B 3/008 |
| | | | 280/79.11 |
| 2013/0187352 A1 | 7/2013 | Hassell | |
| 2014/0021691 A1 * | 1/2014 | Buttazzoni | B62B 3/007 |
| | | | 280/79.11 |
| 2014/0103615 A1 | 4/2014 | Tsai | |
| 2014/0210188 A1 | 7/2014 | Buttazzoni | |
| 2014/0300070 A1 | 10/2014 | Veronie | |
| 2015/0320221 A1 * | 11/2015 | Williams | A47C 7/62 |
| | | | 248/188.5 |
| 2016/0137215 A1 | 5/2016 | Ondrasik | |
| 2017/0151973 A1 | 6/2017 | Buttazzoni | |
| 2017/0217466 A1 | 8/2017 | Buttazzoni | |
| 2018/0222511 A1 * | 8/2018 | Turner, Jr. | B62B 5/0083 |
| 2022/0242472 A1 * | 8/2022 | Makin | B62B 5/0093 |

FOREIGN PATENT DOCUMENTS

| | | |
|---|---|---|
| EP | 3044079 A1 | 7/2016 |
| FR | 548795 A | 1/1923 |
| JP | S62 129363 U | 8/1987 |
| WO | 2010/027919 A2 | 3/2010 |

OTHER PUBLICATIONS

Australian Government IP Australia, Examination report No. 1 in Application No. 2018434893, dated Dec. 8, 2020 (7 pages).

PCT, Notification of Transmittal of the International Search Report and the Written Opinion of the International Searching Authority, or the Declaration, in International application No. PCT/US18/00124 (3 pages).

European Patent Office, Communication with extended European search report, Application No. 21170495.2, dated Sep. 27, 2021 (7 pages).

Australian Government IP Australia, Examination Report No. 1, Application No. 2021202452, dated Mar. 31, 2022 (5 pages).

* cited by examiner

DOLLY

CROSS REFERENCE TO RELATED APPLICATIONS

This application claims the benefit of U.S. Appl. 63/015,745, filed on Apr. 27, 2020, the entirety of which is incorporated by reference herein.

BACKGROUND

Generally, this application relates to dollies for moving relatively heavy or bulky objects, such as appliances (e.g., refrigerators, washing machines, etc.), furniture, or the like.

SUMMARY

According to certain embodiments described herein, a dolly includes a first skate, a second skate, and at least one rod (e.g., two rods) connected to the skates. The first skate is connected to a plurality of wheels and has at least one receiving region (e.g., two receiving regions). The second skate is connected to a plurality of wheels and has at least one receiving region. The second skate includes an outer lateral surface and at least one receiving region (e.g., two receiving regions) having a corresponding at least one aperture (e.g., two apertures) through the outer lateral surface. The at least one rod is connected to the first skate and the second skate to couple the first skate with the second skate. The at least one rod may have a length greater than that of the first or second skates. The at least one rod may have an adjustable length (e.g., the at least one rod may be telescoping). The at least one rod is connected to the first skate via a corresponding one of the at least one receiving region of the first skate. The at least one rod may be secured to the first skate, such that the relative positions of the at least one rod and the first skate do not change. The at least one rod is further connected to the second skate via a corresponding one of the at least one receiving region of the second skate. The at least one rod may be perpendicular to the first skate and the second skate. The at least one rod is further configured to extend through a corresponding one of the at least one aperture through the outer lateral surface of the second skate by a variable amount. the at least one rod is configured to be selectively disconnected from the first skate and the second skate.

The first skate may have a horizontally-oriented surface configured to receive a load and a wall extending upwardly above the horizontally-oriented surface in a vertical dimension. The wall is configured to prevent the load from extending past an outer lateral extent of the first skate. The second skate may have a horizontally-oriented surface configured to receive the load and a wall extending upwardly above the horizontally-oriented surface in a vertical dimension. The wall is configured to prevent the load from extending past an outer lateral extent of the second skate.

The dolly may further include at least one end cap (e.g., two end caps) connected to a corresponding one of the at least one rod, wherein the at least one end cap prevents the second skate from disconnecting from the at least one rod.

According to certain embodiments described herein, a dolly includes a first skate, a second skate, a first rod, and a second rod. The lengths of each of the rods may be greater than the lengths of each of the skates. The first skate is connected to a plurality of wheels (e.g., in-line wheels) and includes a first and second receiving region. The second skate is connected to a plurality of wheels (e.g., in-line wheels) and includes a first and second receiving region. The second skate also includes a first aperture and a second aperture, each of which extends through an outer lateral surface of the second skate. The first rod (e.g., one with a variable length, such as a telescoping rod) maintained in a perpendicular orientation to the first skate via the first receiving region of the first skate. The first rod may be securable to the first skate, such that when the first rod is secured to the first skate, the relative positions of the first rod and the first skate do not change. The first rod is also maintained in a perpendicular orientation to the second skate via the first receiving region of the second skate. The first rod is extendible by a variable length through the first aperture through the outer lateral surface of the second skate. The first rod may be selectively disconnected from the first skate and the second skate. The second rod (e.g., one with a variable length, such as a telescoping rod) is maintained in a perpendicular orientation to the first skate via the second receiving region of the first skate. The second rod may be securable to the first skate, such that when the second rod is secured to the first skate, the relative positions of the second rod and the first skate do not change. The second rod is also maintained in a perpendicular orientation to the second skate via the second receiving region of the second skate. The second rod is extendible by a variable length through the second aperture through the outer lateral surface of the second skate. The second rod may be selectively disconnected from the first skate and the second skate.

The first skate may have a horizontally-oriented surface configured to receive a load and a wall extending upwardly above the horizontally-oriented surface in a vertical dimension. The wall is configured to prevent the load from extending past an outer lateral extent of the first skate. The second skate may have a horizontally-oriented surface configured to receive the load and a wall extending upwardly above the horizontally-oriented surface in a vertical dimension. The wall is configured to prevent the load from extending past an outer lateral extent of the second skate.

The dolly may further include two end caps connected to the respective rods, wherein the end caps prevent the second skate from disconnecting from the rods. The end caps may be selectively disconnected from the rods.

According to certain embodiments described herein, a dolly includes: a first skate including a first plurality of wheel-accepting regions; a second skate including a second plurality of wheel-accepting regions, wherein the second skate is substantially parallel to the first skate; a first rod substantially perpendicular to the first skate and the second skate, wherein the first rod connects to the first skate and connects to the second skate; a second rod substantially perpendicular to the first skate and the second skate, and substantially parallel to the first rod, wherein the first rod connects to the first skate and connects to the second skate; a first plurality of wheels (e.g., four in-line wheels) configured to be received by corresponding ones of the first plurality of wheel-accepting regions; a second plurality of wheels (e.g., four in-line wheels) configured to be received by corresponding ones of the second plurality of wheel-accepting regions; a plurality of first axles extending through corresponding holes in the first plurality of wheels; and a plurality of second axles extending through corresponding holes in the second plurality of wheels. The plurality of first axles are each configured to snap into the first skate, and the plurality of second axles are each configured to snap into the second skate. The first skate may comprise a first plurality of springs configured to allow corresponding ones of the plurality of first axles to snap into the first skate, and the second skate may comprise a second plurality of springs configured to allow corresponding ones of the plurality of second axles to snap into the second skate. The first skate may further comprise a third plurality of springs that, in combination with the first plurality of springs, are configured to allow corresponding ones of the plurality of first axles to snap into the first skate. The second skate may further comprise a fourth plurality of springs that, in combination with the second plurality of springs, are configured to allow corresponding ones of the plurality of second axles to snap into the second skate.

According to certain embodiments described herein, a dolly includes: a first skate and a first plurality of wheels maintained in a fixed position with the first skate via a corresponding first plurality of axles, wherein the first plurality of axles extend through the first plurality of wheels and connect to the first skate; a second skate and a second plurality of wheels maintained in a fixed position with the second skate via a corresponding second plurality of axles, wherein the second plurality of axles extend through the second plurality of wheels and connect to the second skate; a first rod substantially perpendicular to the first skate and the second skate, wherein the first rod connects to the first skate and the second skate; and a second rod substantially perpendicular to the first skate and the second skate, wherein the second rod connects to the first skate and the second skate. The first and second rods connect to the first and second skates via corresponding receiving portions in the skates. Each receiving portion comprises a deflecting region on a bottom surface of the respective skate, and the deflecting regions are shaped to promote travel of the dolly by gradually pushing the dolly up over objects in the path of travel of the dolly. The radius of each deflecting region may be approximately between 0.5" and 1" (e.g., 0.75").

According to certain embodiments described herein, a dolly includes: a first skate and a first plurality of wheels maintained in a fixed position with the first skate via a corresponding first plurality of axles, wherein the first plurality of axles extend through the first plurality of wheels and connect to the first skate; a second skate and a second plurality of wheels maintained in a fixed position with the second skate via a corresponding second plurality of axles, wherein the second plurality of axles extend through the second plurality of wheels and connect to the second skate; a first rod substantially perpendicular to the first skate and the second skate, wherein the first rod connects to the first skate and the second skate; and a second rod substantially perpendicular to the first skate and the second skate, wherein the second rod connects to the first skate and the second skate. When the dolly is in a substantially upright position, the dolly is configured to be tilted to a maximum angle such that the first stopping portion, the second stopping portion, only one of the plurality of first wheels, and only one of the plurality of second wheels maintain contact on a resting surface. When fully tilted, the angle between the resting surface and loading surfaces on the skates may be approximately 30 degrees. The two stopping portions may be located on trailing edge of the first skate and on a trailing edge of the second skate, respectively.

According to certain embodiments disclosed herein, a dolly includes: a first skate connected to a first plurality of wheels; a second skate connected to a second plurality of wheels; a first rod substantially perpendicular to the first skate and the second skate, wherein the first rod connects to the first skate and the second skate; and a second rod substantially perpendicular to the first skate and the second skate, wherein the second rod connects to the first skate and the second skate, wherein the first and second rods connect to the first and second skates via two corresponding receiving regions in the first skate and two corresponding receiving regions in the second skate, wherein each receiving region comprises an outer aperture, and wherein the first rod is configured to pass through the first outer aperture, and wherein the second rod is configured to pass through the second outer aperture. A first endcap is connected to the first rod to prevent the first rod from coming out of the first outer aperture. A second endcap is connected to the second rod to prevent the second rod from coming out of the second outer aperture. The first endcap may include a flange configured to extend outside of an outer perimeter of the first rod. The second endcap may include a flange configured to extend outside of the outer perimeter of the second rod. The first endcap flange may prevent the first rod from coming out of the first outer aperture. The second endcap flange may be configured to prevent the second rod from coming out of the second outer aperture.

Figure 1:
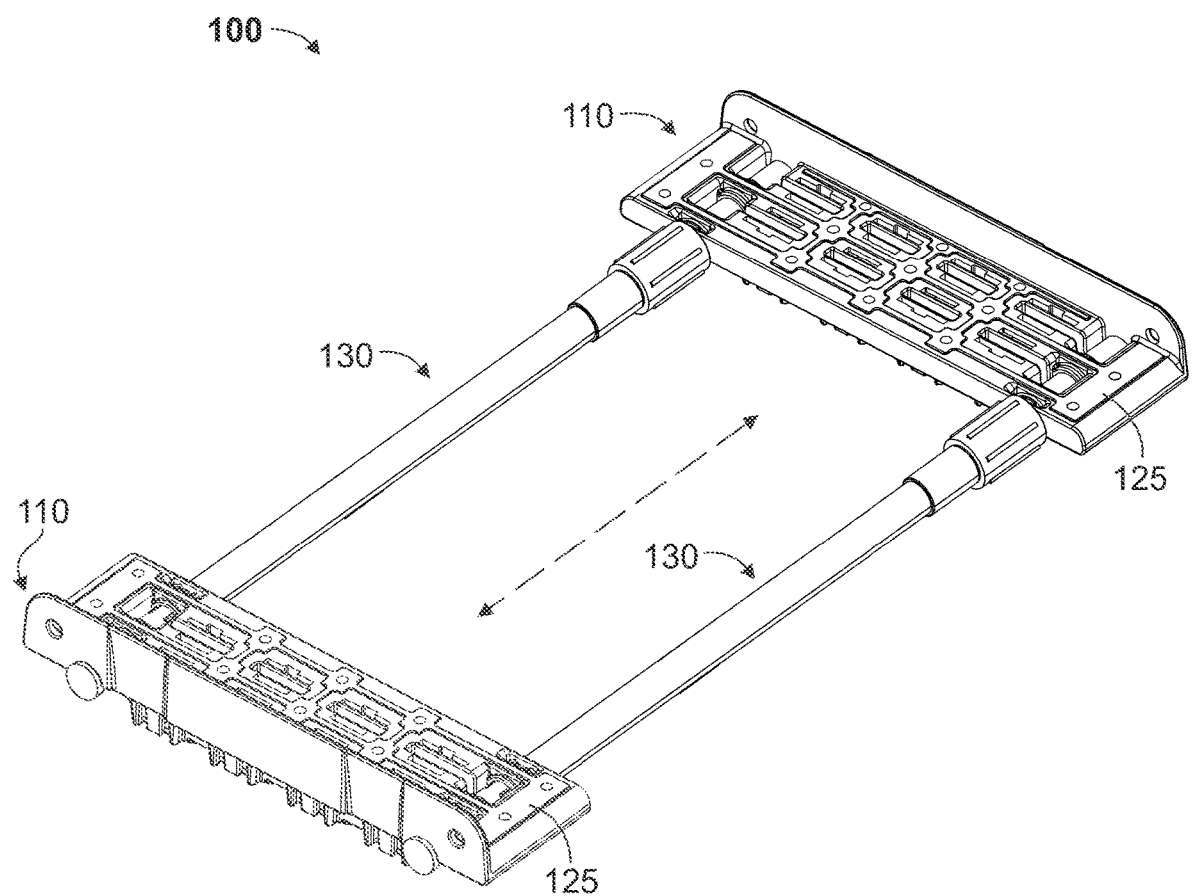
FIG. 1 illustrates a perspective view of a dolly, according to certain embodiments.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Various embodiments of a dolly are disclosed herein. The dolly has an adjustable width to securely and efficiently support loads having different widths. For example, the dolly can be expanded to a wider width to accommodate a load such as a washing machine. Then the dolly can be collapsed to stably support a narrower load such as a television. The dolly can have adjustable rods that space two skates apart from each other by a varying distance. Furthermore, the rods can extend through one of the skates, thereby allowing the skates to be brought even closer together.

Various additional innovations are disclosed herein. For example, a deflector design that facilitates movement of the dolly over interfering objects in the path of travel is disclosed. As another example, a design for snapping in wheel axles into the skates of the dolly is described and depicted. As another example, a design that allows for stable and predictable tilting of the dolly is disclosed. These are but a few examples of the features and embodiments of the dolly disclosed herein.

Figure 2:
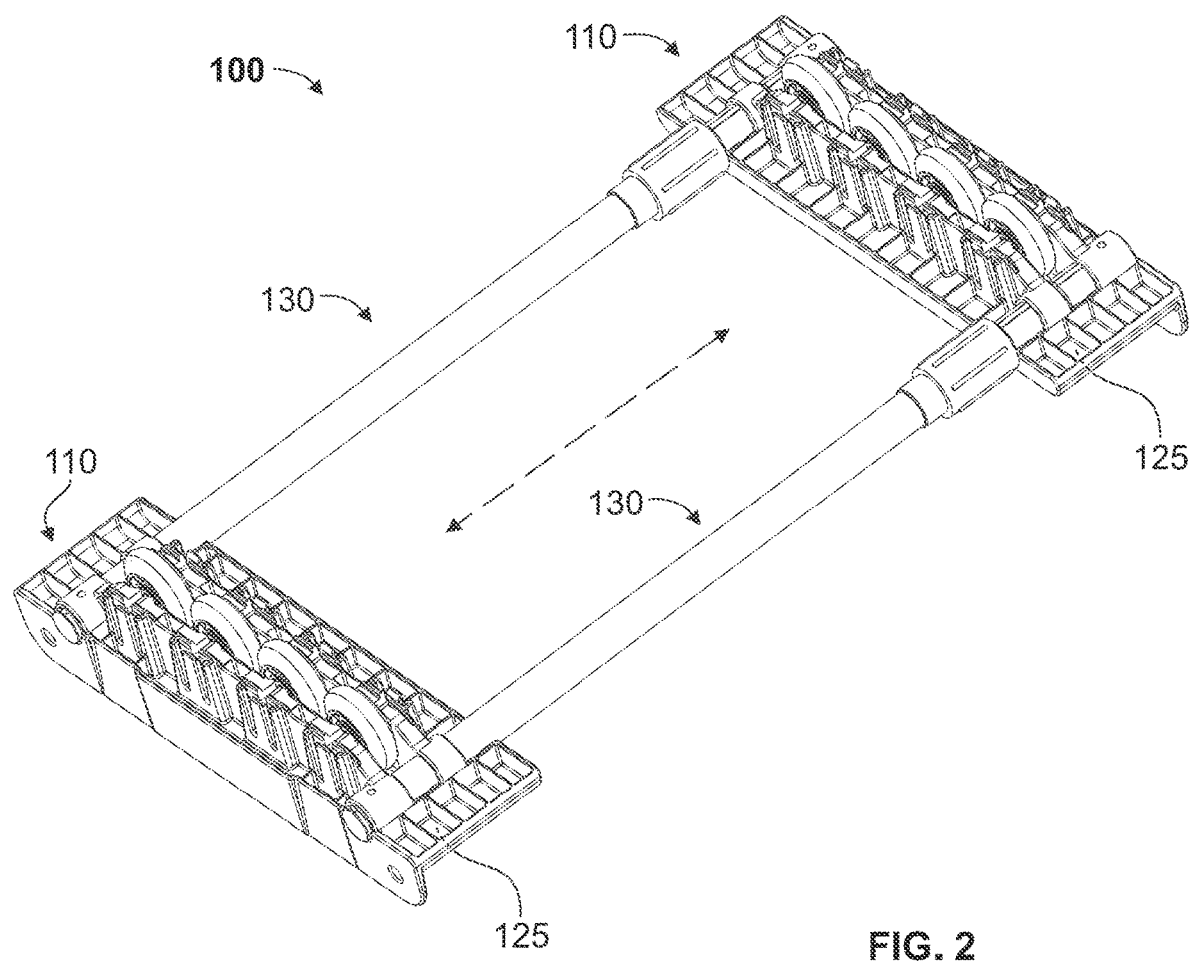
FIG. 2 illustrates a perspective view of the dolly in an upside-down position, according to certain embodiments.
Figure 3A:
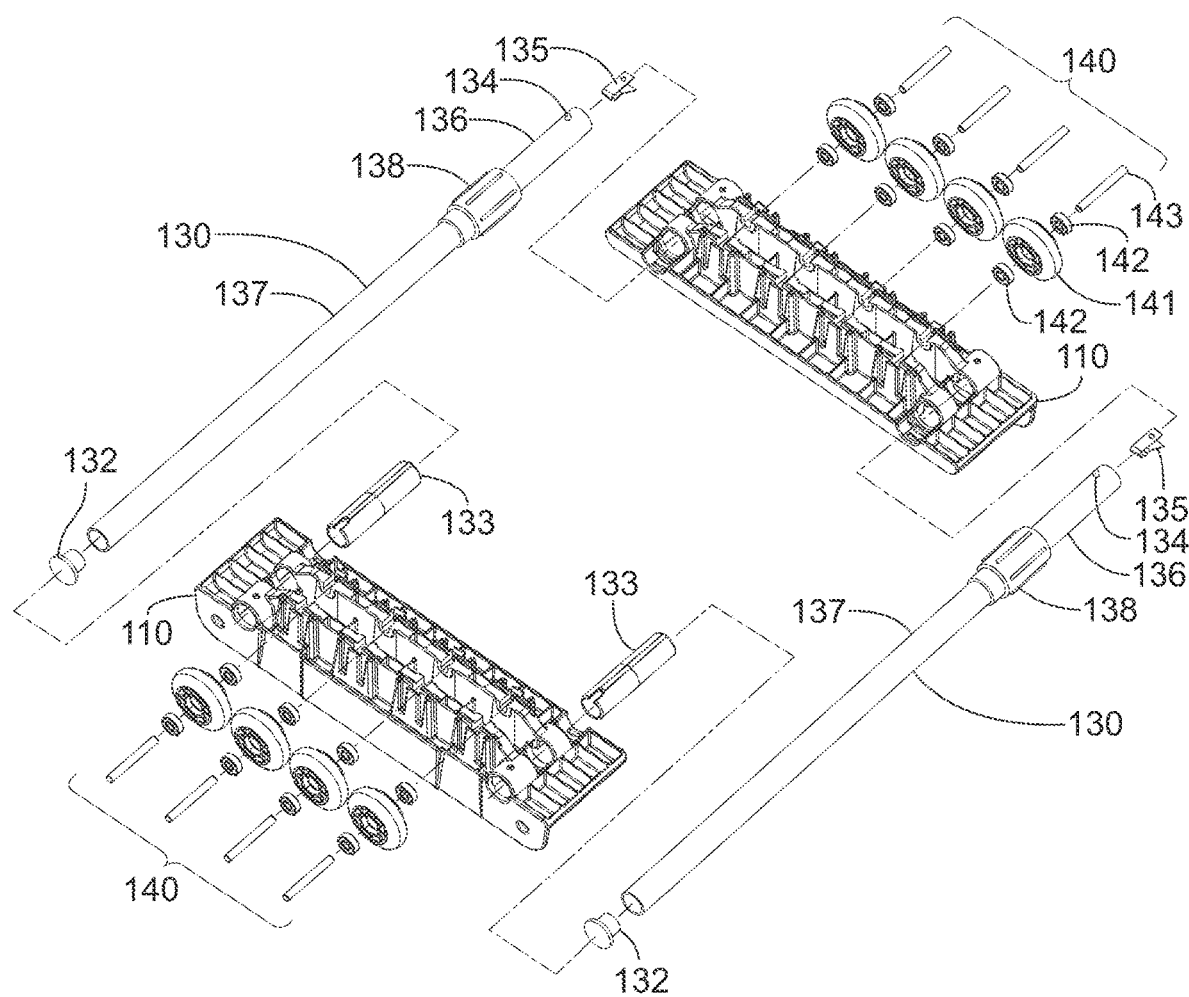
FIG. 3A illustrates a perspective and exploded view of the dolly in an upside-down position, according to certain embodiments.
Figure 4A:
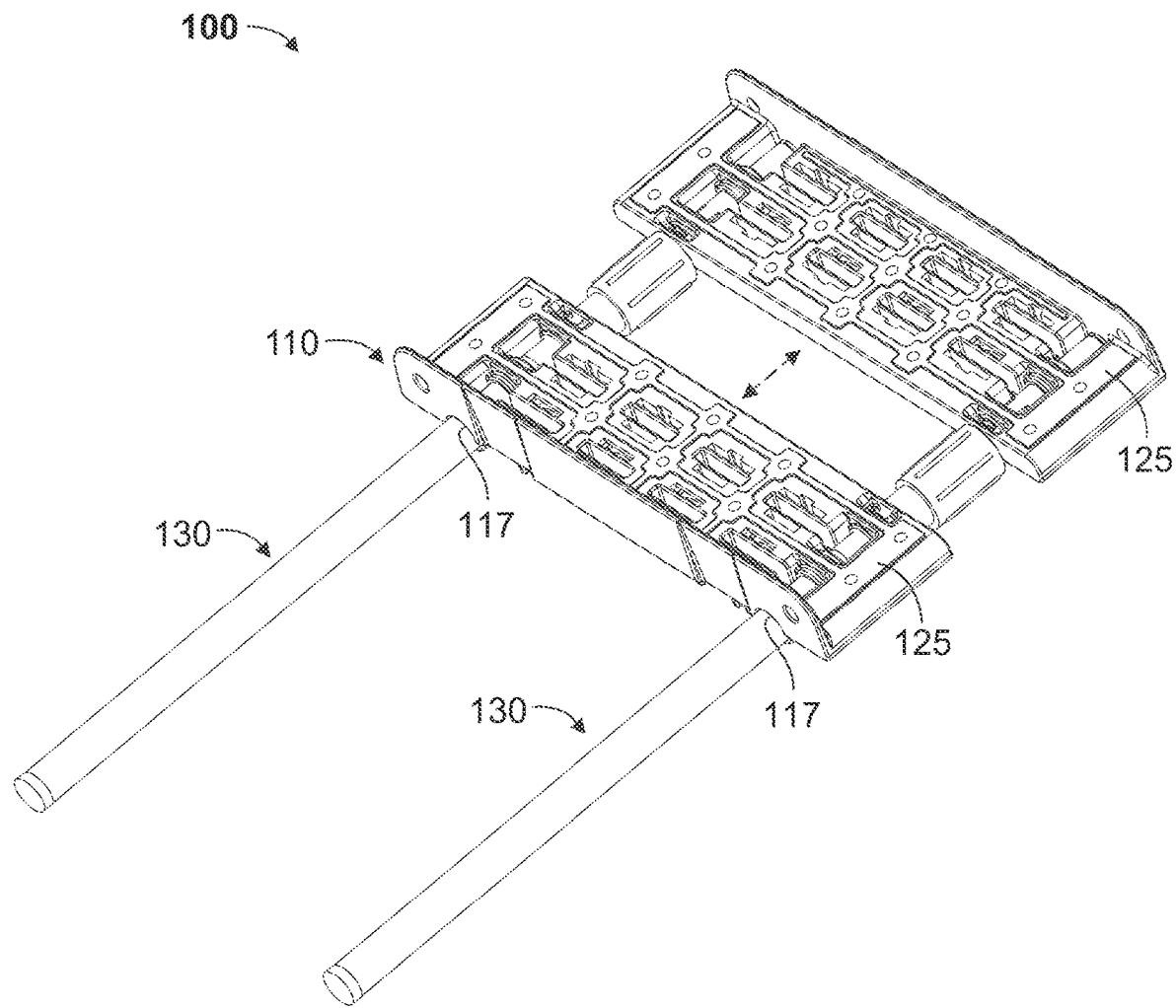
FIG. 4A illustrates a perspective view of the dolly in a collapsed position, according to certain embodiments.
Figure 4B:
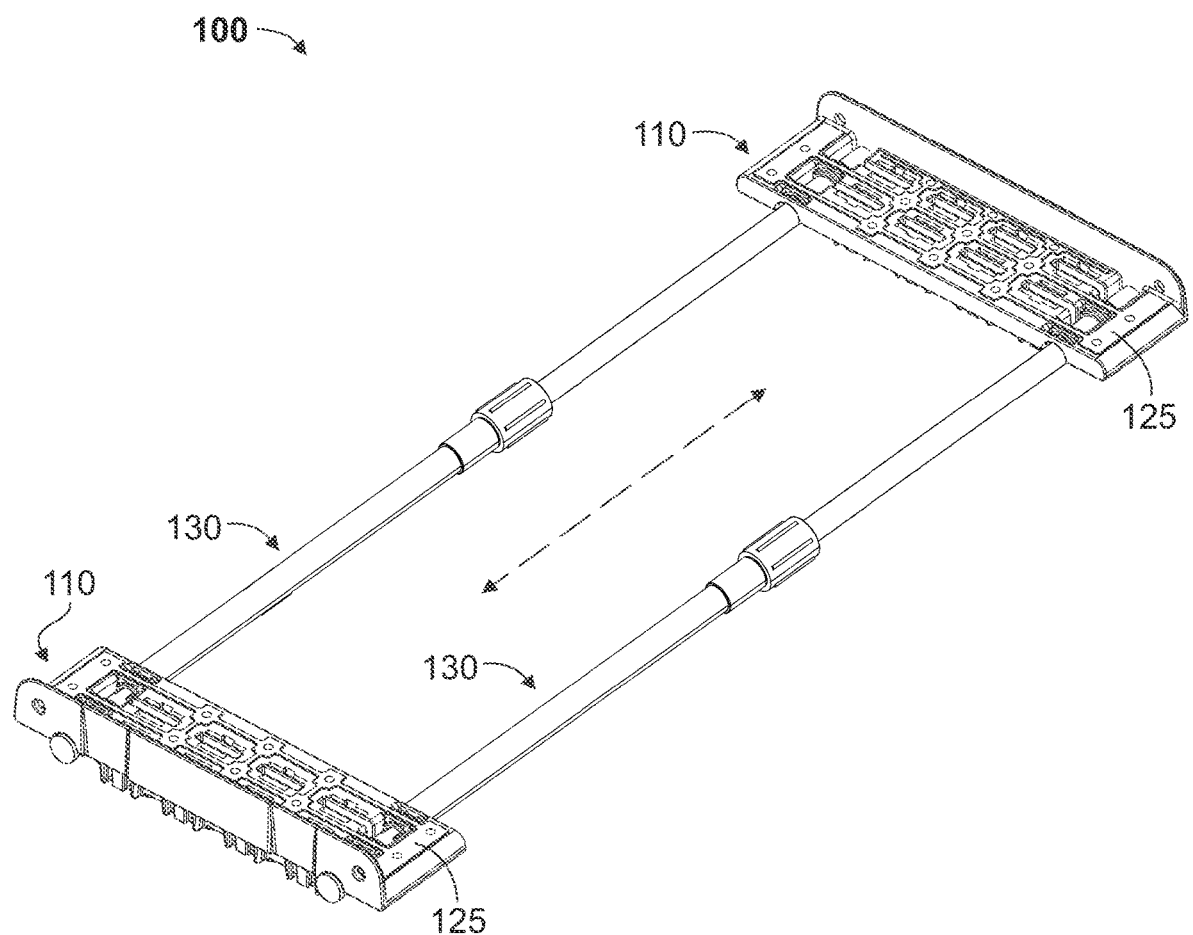
FIG. 4B illustrates a perspective view of the dolly in an expanded position, according to certain embodiments.
Figure 5:
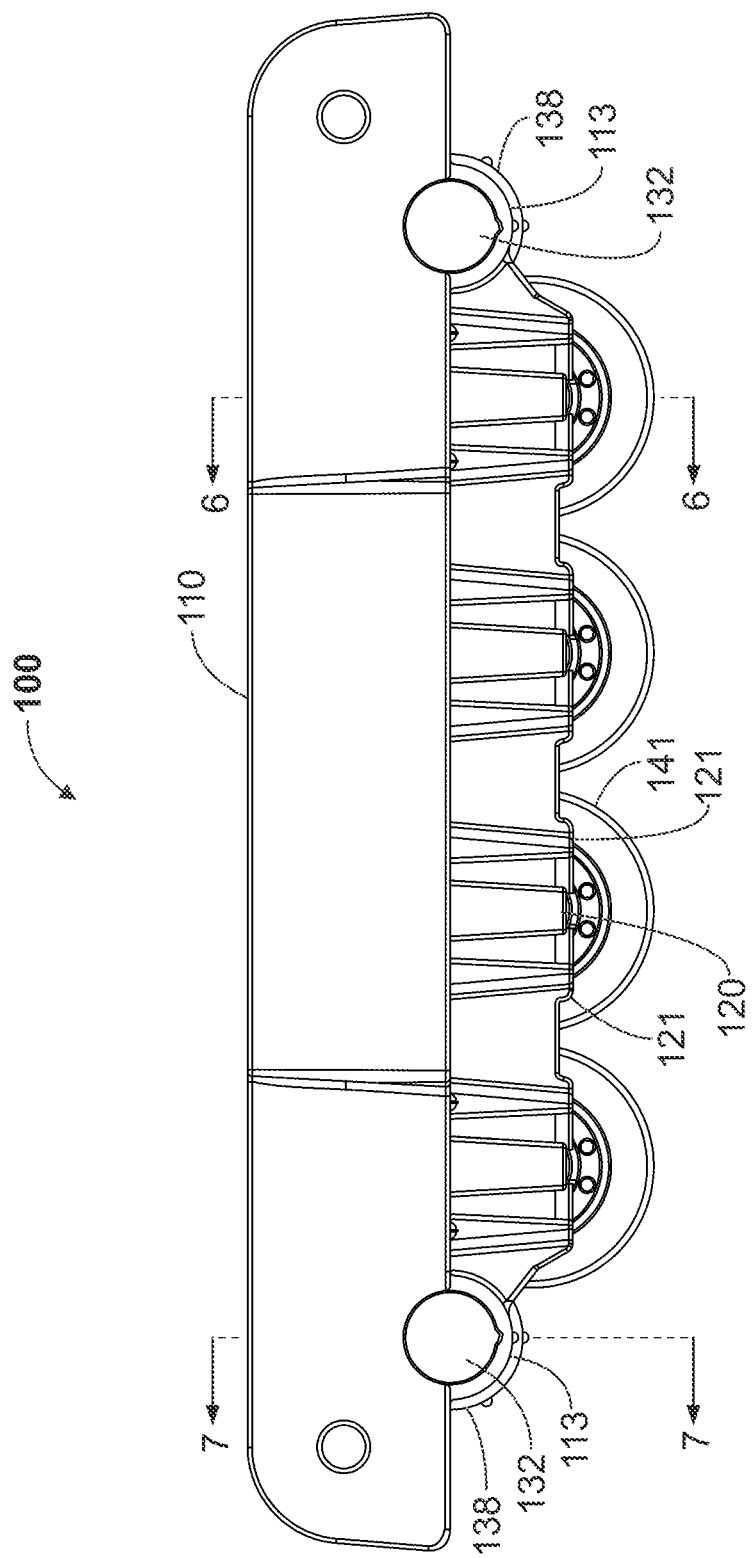
FIG. 5 illustrates a side elevation view of the dolly, according to certain embodiments.
Figure 6:
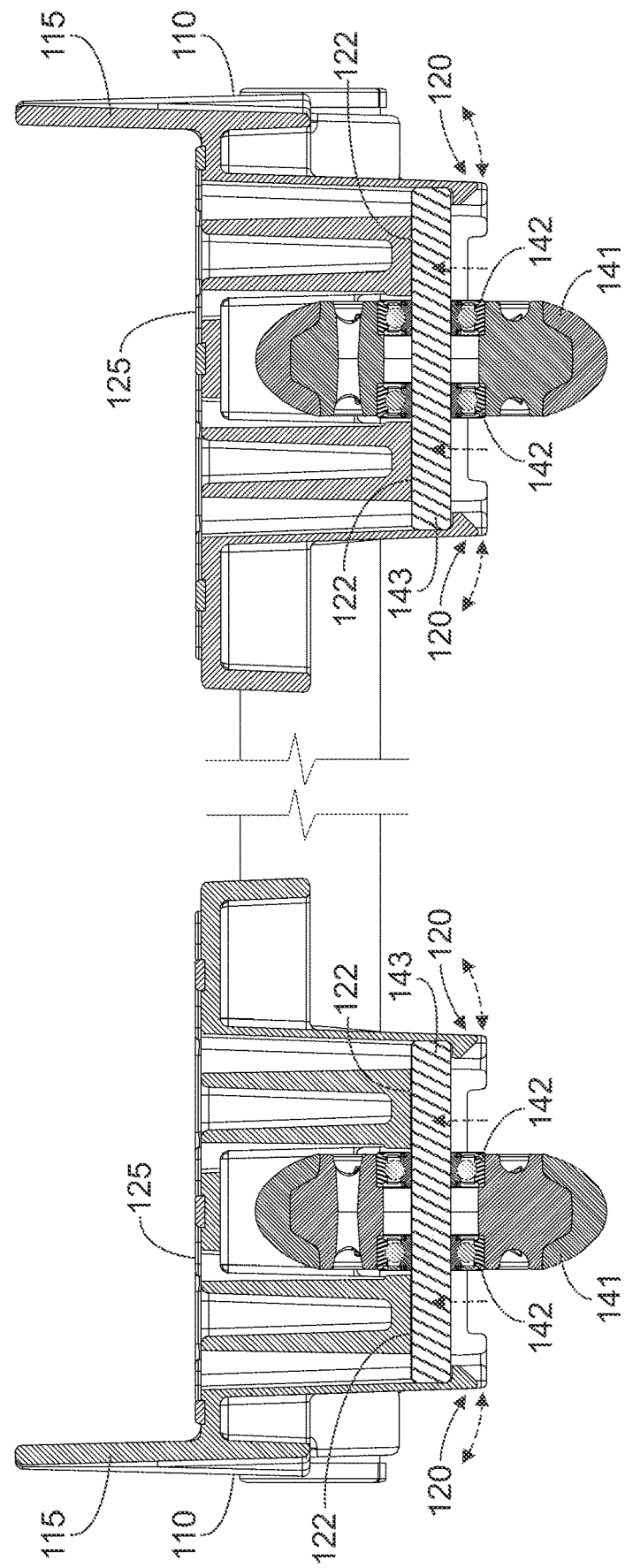
FIG. 6 illustrates a cross-sectional view of the dolly depicted in FIG. 5, where the cross-section is taken along the line indicated as 6-6, according to certain embodiments.

As shown in FIGS. 1, 2, 3A, 4A, and 4B, a dolly 100 may include two skates 110 (right and left) connected by two rods 130 (front and back). The skates 110 may be identical or substantially identical to each other. The skates 110 may be formed of a material such as aluminum or other metals and/or resins such as polypropylene. The skates 110 may be inverted and/or parallel with respect to each other, as assembled in the dolly 100. As can be seen in FIGS. 2, 3A, and 5, each of the skates 110 is connected to wheels 141. Each wheel 141 is part of a wheel assembly, as shown in FIGS. 3A and 6. In addition to the wheel 141 itself, each wheel assembly includes two bearings 142 (e.g., ball bearings) connected on each lateral side of the wheel and an axle 143 that passes through the bearings 142 and the wheel 141. As shown, each skate 110 is connected to four wheels 141 via corresponding axles 143, but more or fewer wheels 141 could be used. The wheels 141 can be in-line wheels, such as those found on in-line skates. The wheels 141 can maintain a fixed relationship with the skate 110 to which they are attached, such that the wheels 141 do not rotate in any dimension aside from rotation around respective axles 143 (e.g., the wheels 141 do not swivel).

Figure 7:
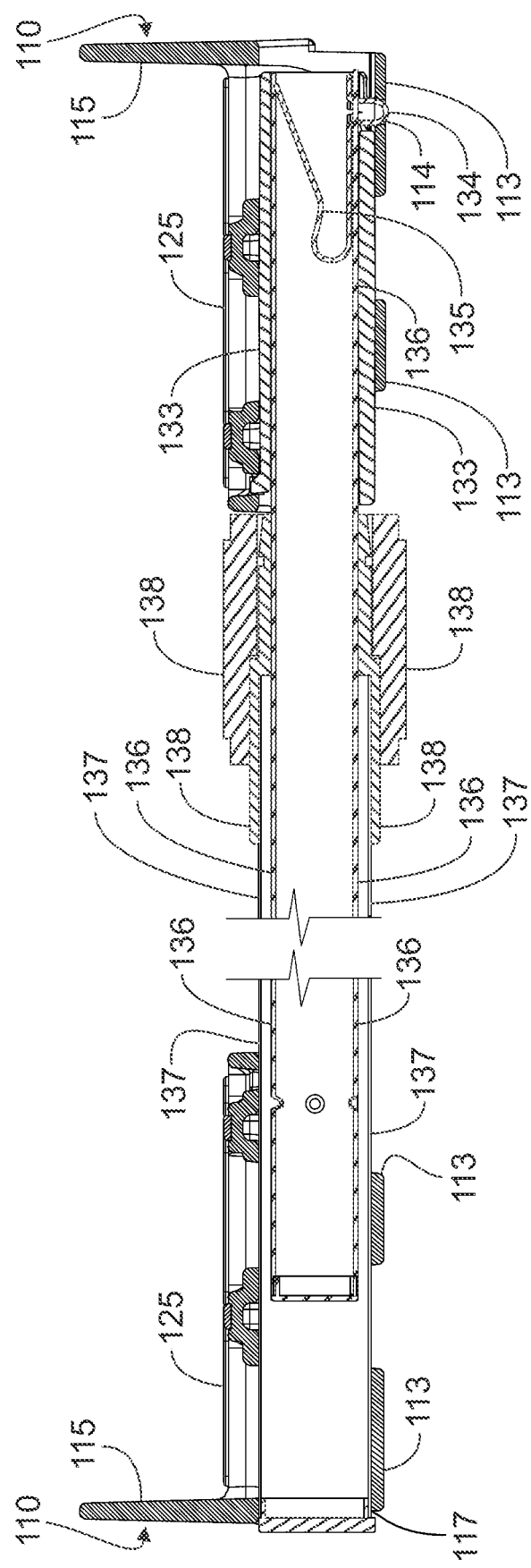
FIG. 7 illustrates a cross-sectional view of the dolly depicted in FIG. 5, where the cross-section is taken along the line indicated as 7-7, according to certain embodiments.

The rods 130 may be identical or substantially identical to each other. The rods 130 may be parallel to each other. The length of the rods 130 may be greater than the length of the skates 110. A given rod 130 could be solid or hollow, or a combination thereof. A rod 130 could have a circular cross-sectional profile or some other geometric shape. A rod 130 may, but need not, have a length that is greater than its width, as depicted. The rods 130 may each be of adjustable length, thereby providing adjustability of the width of the dolly 100. Such adjustability of the width of the dolly 100 due to the adjustable length of the rods 130 can be seen by comparing FIG. 1 with FIG. 4B. More particularly, the separation between the skates 110 is adjustable. This allows the dolly 100 to accommodate loads of different widths in a stable and efficient manner. In FIG. 4B, the rods 130 have a maximized length, thereby resulting in the dolly 100 being extended its maximum width. In FIG. 1, the rods 130 are at their minimum length. When the rods 130 are at their minimum length, the dolly 100 may or may not be at its minimum width. According to certain embodiments that will be described in more detail below, the rods 130 can extend through one of the skates 110 via apertures 117 by a variable amount, thereby allowing the skates 110 to be positioned closer to each other, as shown in FIG. 4A. As shown in FIGS. 4A and 7, the minimum separation of the skates 110 is determined by the locking mechanisms 138 on the rods 130, which can have an outer radius greater than the inner radius of the innermost part of the receiving regions of the skates 110. However, in other designs, the skates 110 could be brought into contact with each other or maintain separation based on some other feature. Thus, the width of the dolly 100 is continuously adjustable over a wide range (e.g., 6"-48").

Figure 3B:
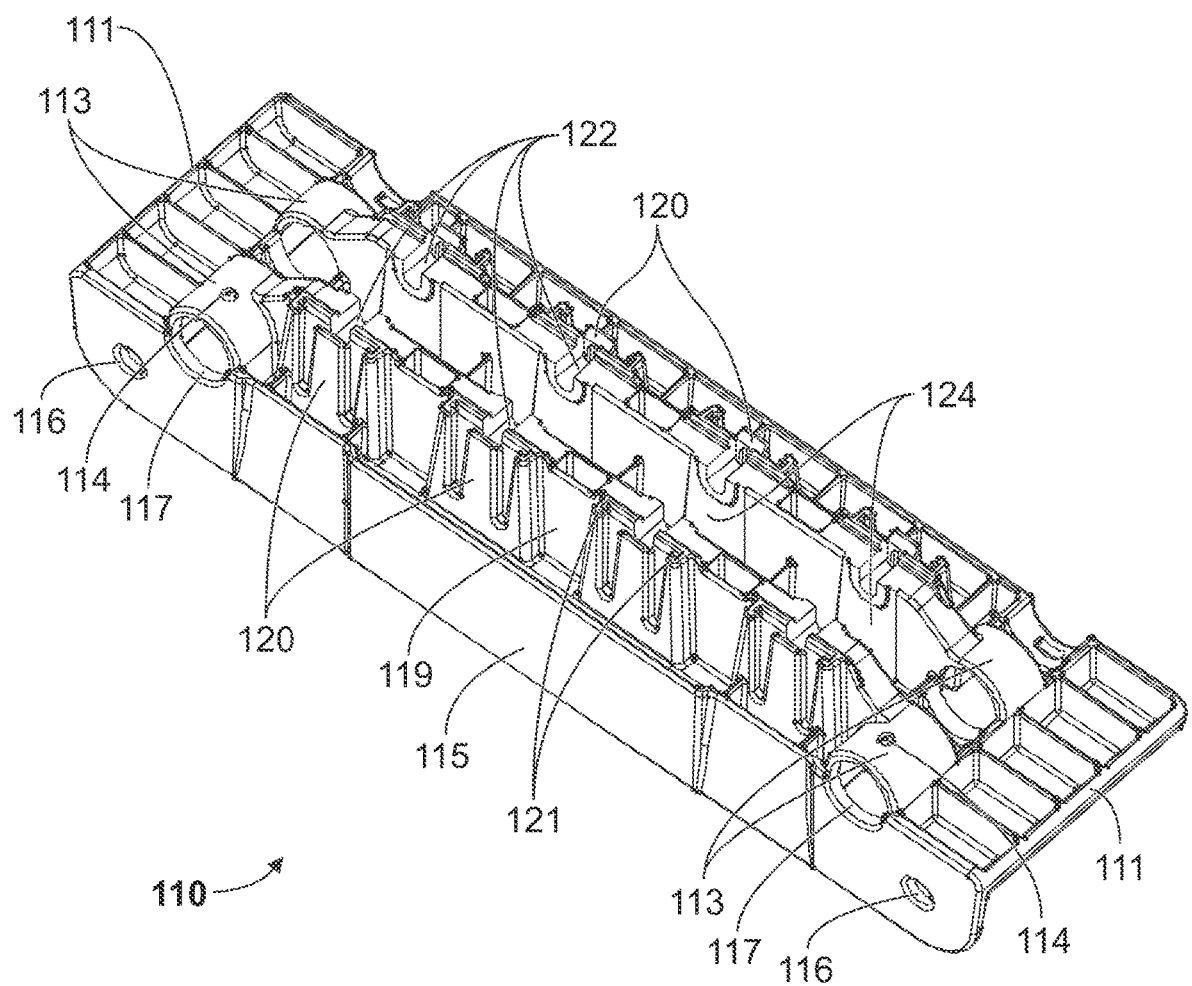
FIG. 3B illustrates a perspective view of a skate in an upside-down position, according to certain embodiments.

The components of the dolly 100 are shown in FIGS. 3A and 3B. This depiction of the dolly 100 includes some, but not all, of the embodiments disclosed herein. Each rod 130 can be telescoping. As depicted and further shown in FIG. 7, a telescoping rod 130 includes an inner tube 136 that slides into an outer tube 137, which has an inner diameter greater than the outer diameter of the inner tube 136. The tubes 136, 137 can be secured in a stable position with respect to each other by a lock 138, thereby maintaining a selected length. As shown, the lock 138 is a twist-style compression lock. The lock 138 is secured to the outer tube 137 and can be tightened around the inner tube 136 to selectively allow the inner tube 136 to move or be locked into a stable position with respect to the outer tube 137. The lock 138 can be easy to manipulate manually.

Each rod 130 is removably secured to one of the skates 110 via a spring 135 and pin 134. When secured, the pin 134 extends through at least a portion of the wall of the inner tube 136 and through a hole 114 in the skate 110. The spring 135 maintains the pin 134 in this secured position. To unsecure the rod 130 from the skate 110, the pin 134 is pushed back through the hole 114 (e.g., by hand) such that the pin 134 can then slide over an outer contour of the skate 110 to remove the inner tube 136 from the skate 110. The spring 135 and pin 134 may only be employed on one side of the rod 130 so as to secure the rod 130 to one skate 110 only. Optionally, another locking mechanism (e.g., spring 135 and pin 134) may be provided to secure or removably secure the rod 130 to the other skate 110 (e.g., the pin 134 passes through the outer wall of the outer tube 137 and through a hole 114 in the other skate 110, and is maintained in place via the spring 135) or by other methods.

As shown in FIGS. 1, 4A, 4B, and 6, each skate 110 includes a horizontally-oriented surface 125 on an upper surface of the skate 110. The horizontally-oriented surface 125 receives the load and may be approximately 18" long and 4.75" wide, for example. The horizontally-oriented surface 125 may be substantially flat and may have holes or recesses. Such holes or recesses may reduce the amount of material needed to form the skate 110, thereby reducing weight and cost. Proximate the front and back of each skate 110 are ingress/egress regions. As shown in FIGS. 1, 4A, and 4B, these regions can have a sloped or rounded region extending between leading/trailing edges of the skate 110 and the horizontally-oriented surface 125. By virtue of the sloped or rounded design, the ingress/egress regions can promote transitioning the load onto the skate. For example, the ingress/egress regions can facilitate loading of the load onto the horizontally-oriented surface 125 without possibly having to substantially tilt the load first.

As shown in FIG. 3B, the underside and outer lateral side of the skate 110 include various features that will be further described in the context of other figures. The skate 110 includes trailing and/or leading edges 111, which may be used as stopping portions as will be described with respect to FIG. 9. The skate 110 further includes deflecting regions 113, which may deflect the skate 110 over objects along the path of travel of the dolly 100 as will be described with respect to FIG. 8.

As shown in FIGS. 2, 3A, 3B, and 7, the skate 110 includes spaces which serve as receiving regions for the rods 130. Each rod 130 passes through a space defined at least partially by the portions of the skate 110 that include the deflecting regions 113. Other configurations of a receiving region are possible, such as a receiving region surrounded by one or more rings or tubes. In any event, it is understood that a given receiving region of the skate 110 receives a corresponding rod 130 to connect the rod 130 to the skate 110.

As shown in FIGS. 3A and 7, the dolly 100 can further include two sleeves 133. Each sleeve 133 assists in creating a tighter fit for the rod 130 into one of the skates 110. For example, the rod 130 can be asymmetric, with one side being narrower than the other (e.g., the inner tube 136 is narrower than the outer tube 137). At the same time, the skates 110 on each side of the dolly 100 can be identical. A receiving region on the skate 110 for the rod 130 must be large enough to accommodate the wider outer tube 137. Thus, the narrower inner tube 136 will fit more loosely into an identical receiving region. A sleeve 133 can be positioned between a portion of the rod 130 (e.g., the inner tube 136) and the outer extent of the receiving region to better stabilize the position of the rod 130 in the receiving region of the skate 110 (e.g., the sleeve 133 could reduce wiggling).

The skate 110 further includes holes 114, which receive the pins 134, as described above and shown in FIG. 7. The exterior of the hole 114 may allow easy access for a user to press the pin 134 through the hole 114 to disengage the rod 130 from the skate 110. As shown in FIG. 6 and other figures, a wall 115 prevents the load from extending past an outer lateral extent of the skate 110. The wall 115 may also guide the load onto the horizontally-oriented surface 125. The wall 115 may extend along the entire length of the skate 110 (length-wise). The wall may be at least 1.5" high, as measured from the elevation of the horizontally-oriented surface 125 to the elevation of the top of the wall 115. Apertures 116 are provided through the outer lateral surface of the skate 110 (e.g., through the wall 115) to accommodate ropes, straps, bungee cords, ratchet straps or the like to secure the load to the dolly 100.

The skate 110 includes apertures 117 through the outer lateral surface of the skate 110. A given aperture 117 allows one end of a respective rod 130 to pass entirely across the width of the skate 110, such that the rod 130 further extends outwardly from the outer lateral surface of the skate 110 by an adjustable distance as shown in FIG. 4A. In order to allow the rod 130 to continuously move through the respective aperture 117, the rod 130 cannot be locked or immovably secured to the skate 110 such that their relative positions cannot change. Without the rod 130 being immovably secured to the skate 110, the rod 130 could be inadvertently removed from the skate 110 altogether. To prevent such inadvertent removal, an additional feature or component can be provided. As shown in FIGS. 3A and 7, an endcap 132 is attached to one end of the rod 130—as depicted, the wider end, or the outer tube 137. The endcap 132 is shown to include a flange that has a diameter larger than that of the aperture 117. Part of the endcap 132 (for example the flange) can prevent the rod 130 from being removed from the skate 110 by preventing the rod 130 from being removed from the aperture 117. A portion of the endcap 132 may be inserted into or onto the rod 130 (e.g., the outer tube 137) and be secured due to friction between the endcap 132 and the rod 130. The endcap 132 may be selectively removable from the rod 130 to allow the rod 130 to be removed from the aperture 117 and from the skate 110 altogether. For example, when the load is not present, the skate 110 can be rapidly or forcefully moved along the rods 130 towards the endcaps 132, such that the outer lateral surface of the skate 110 engages with the flanges and forces the endcaps 132 off of the rods 130 by overcoming the frictional force holding the endcaps 132 to the rods 130. While the endcap 132 is shown as being a cap that fits on the end of a rod 130, that need not be the case. An endcap 132 need not fit precisely at the end of a rod 130. Instead, an endcap 132 could be a collar around the rod 130 or some other design feature or component that prevents the rod 130 from being removed from a skate 110.

When the rods 130 are selectively removed from the skates 110 (for example, via spring-loaded pins and/or removable endcaps 132), the dolly 100 can be easily assembled and disassembled, thereby improving the portability of the dolly 100 from site to site. Disassembly also allows the skates 110 of the dolly 100 to be uncoupled from each other altogether. Once uncoupled, the skates 110 can be individually placed under a very wide load that could not otherwise be accommodated with the rods 130 secured to each skate 110.

Referring to FIG. 3B, a skirt 119 provides some level of protection of the wheels 141 from interference with foreign objects. Springs 120 allow the wheel axles 143 to snap into place in the skate 110, as will be further described with respect to FIG. 6. Spring guards 121 provide some level of protection for the springs 120 impact with foreign objects, as will be further described with respect to FIG. 5. Spring guards 121 can be positioned in front of and behind the springs 120. As shown, the springs 120 and spring guards 121 are formed as part of the skirt 119, but that need not be the case. The skate 110 further includes a plurality of recesses 122 that receive the axles 143. The recesses 122 can be formed in the skirt 119. One recess 122 for each side of a given axel 143 is provided. A plurality of recesses 124 receive the wheels 141. The recesses 124, or wheel-receiving regions, are shown as defined in part by the skirt 119.

FIG. 5 depicts a side elevation view of the dolly 100, and provides a different perspective of some of the features already described, including the relationship of the wheels 141 with respect to the skate 110. Also shown is the relationship of the endcap 132 with respect to the skate 110. Further shown is the relationship between the spring 120 and the spring guards 121. The spring 120 (further depicted in FIG. 6) is a flexing feature that may be prone to damage. While the spring 120 is designed to flex inwardly and outwardly along the width of the skate 110, the spring 120 may not be designed to substantially flex along the length of the skate 110 (i.e., a dimension along the line of travel of the dolly 100). Consequently, an undue force along the lengthwise dimension in which the spring 120 is more rigid may damage the spring 120. To reduce the possibility of foreign objects causing such an undue force, spring guards 121 can be positioned ahead of and behind the spring 120 along the direction of travel. As shown in FIG. 3B, the spring guards 121 protrude outwardly along an outer lateral surface the skate 110. Furthermore, as shown in FIG. 5, the bottom of the spring guards 121 extend to a lower elevation than the elevation of the bottom of the spring 120. By extending the spring guards 121 farther down than the spring 120 in this way, the spring 120 can be better protected from a potentially damaging impact with a foreign object.

FIG. 6 is a cross-sectional view of the dolly 100 taken along the line 6-6 shown in FIG. 5, and shows a different perspective of previously-described features. The skate 110 includes a horizontally-oriented surface 125 upon which the load rests. The wall 115 extends upwardly above the horizontally-oriented surface 125 in a vertical dimension, although the wall 115 does not necessarily extend directly over the horizontally-oriented surface 125. Nor must the wall 115 abut, directly connect to, or be contiguous with the horizontally-oriented surface 125. Nor must the wall 115 have a constant height, constant thickness, or be contiguous.

Instead, the wall 115 is configured to prevent the load from extending past an outer lateral extent of the skate 110. The wall 115 can guide placement of the load and keep it secured within the width of the dolly 100.

FIG. 6 further illustrates the relationship between a given axle 143 and opposing springs 120 (one spring 120 on each side of the axle 143), which secure the axle 143 to the skate 110 (and particularly secure the axle 143 in the recesses 122 of the skate 110. The recesses are also depicted and referenced in FIG. 3B. In FIG. 6, the springs 120 (especially the lower region of the springs 120) are shown as being flexible along the general direction of the curved broken lines having double arrowheads. As shown, the springs 120 are integral with the respective skates 110. The springs 120 can be formed of the same material as the skates 110, such as aluminum or other metals and/or resins such as polypropylene. Each spring 120 has an angled surface at a lower interior region of the spring 120, thereby creating a tapering cross-sectional thickness at the lower region of the spring 120. Moving from the bottom of the spring 120 towards the top, the lateral thickness of the spring 120 gradually increases and subsequently decreases (shown as an abrupt decrease forming a nearly horizontal surface in FIG. 6). To attach the wheel assembly (including the wheel 141, bearings 142, and axle 143) to the skate 110, the axle 143 is forced towards the horizontally-oriented surface 125, as depicted by the broken lines having a single arrowhead pointing upwardly. As the axle 143 is forced into the skate 110, the springs 120 are deflected outwardly away from the axle 143 as the thickness of the springs 120 widens, thereby compressing the springs 120. Once the axle 143 is moved to an elevation at which the thicknesses of the springs 120 decreases, the springs 120 decompress towards their natural resting positions, such that they flex inwardly towards the wheel 141 (again, along the general direction indicated by the curved broken lines with two arrowheads). The combination of the pressure applied by the springs 120 and their thickness profiles causes the axle 143 to be secured to the skate 110 (e.g., the axle 143 snaps into corresponding recesses 122 of the skate 110). To remove the wheel assembly (for example, to replace a wheel 141), the springs 120 can be manually compressed such that the axle 143 can be pulled out of the skate 110.

FIG. 7 is a cross-sectional view of the dolly 100 taken along the line 7-7 shown in FIG. 5, and it shows a different perspective of previously-described features. The rod 130 and related components are depicted, including inner tube 136, outer tube 137, lock 138, spring 135, pin 134, endcap 132, and sleeve 133. Also shown are the skates 110, including the horizontally-oriented surfaces 125, walls 115, deflecting regions 113, and an aperture 117 in the left skate 110. Further, the receiving regions in the skates 110 that receive the rod 130 are indicated by the surfaces where the left skate 110 abuts the outer tube 137 and where the right skate 110 abuts the sleeve 133.

Figure 8:
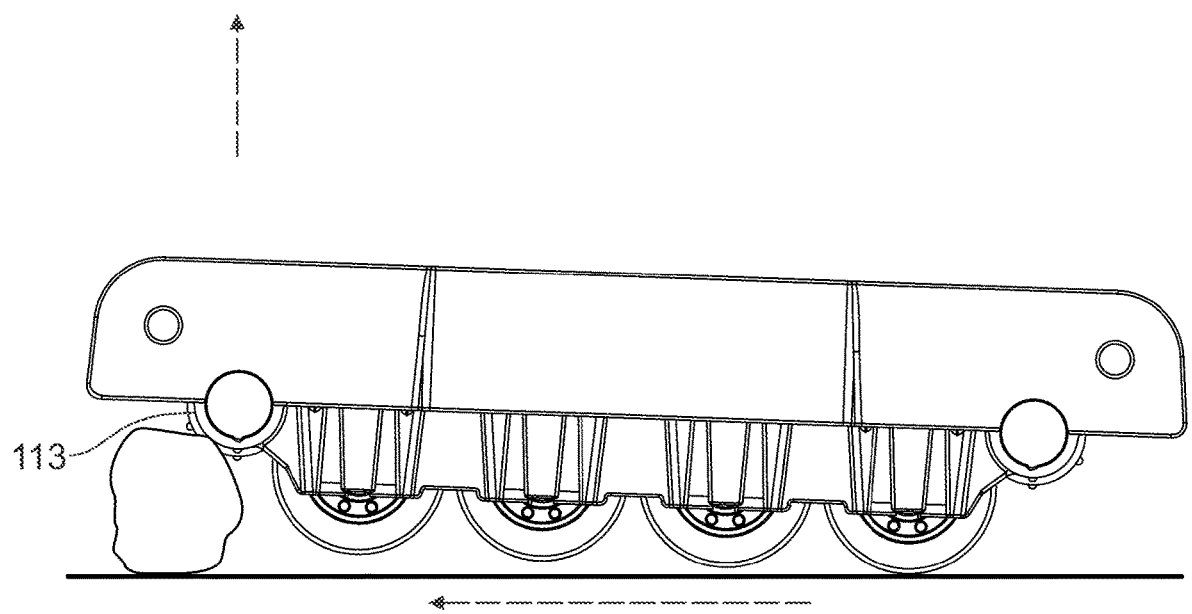
FIG. 8 illustrates a side elevation view of the dolly being deflected by an object, according to certain embodiments.

FIG. 8 depicts a side elevation view of the dolly 100, as the dolly 100 is deflected upwardly over an interfering object along the line of travel, which is indicated by the broken horizontal line going from right to left. The interfering object is shown as a rock, but interference could be caused by any non-horizontal surface such as another type of object or a contour on the ground. When the deflecting region 113 encounters such a contour, the front portion of the skate(s) 110 (and therefore a corresponding portion of the dolly 100) is pushed upwardly as indicated by the vertical broken line. The deflecting region 113 as depicted has a curved profile that promotes deflection. For example, a deflecting region may include an arced surface having a radius between 0.5" and 1" (e.g., 0.75"). Alternatively, the deflecting region 113 may have a straightly-sloped profile, or a combination of curved and straight contours. As the deflecting region 113 is deflected upwardly, so too are the forward wheels 141. The raised wheels 141 facilitate travel of the wheels 141 over the interfering feature.

Figure 9:
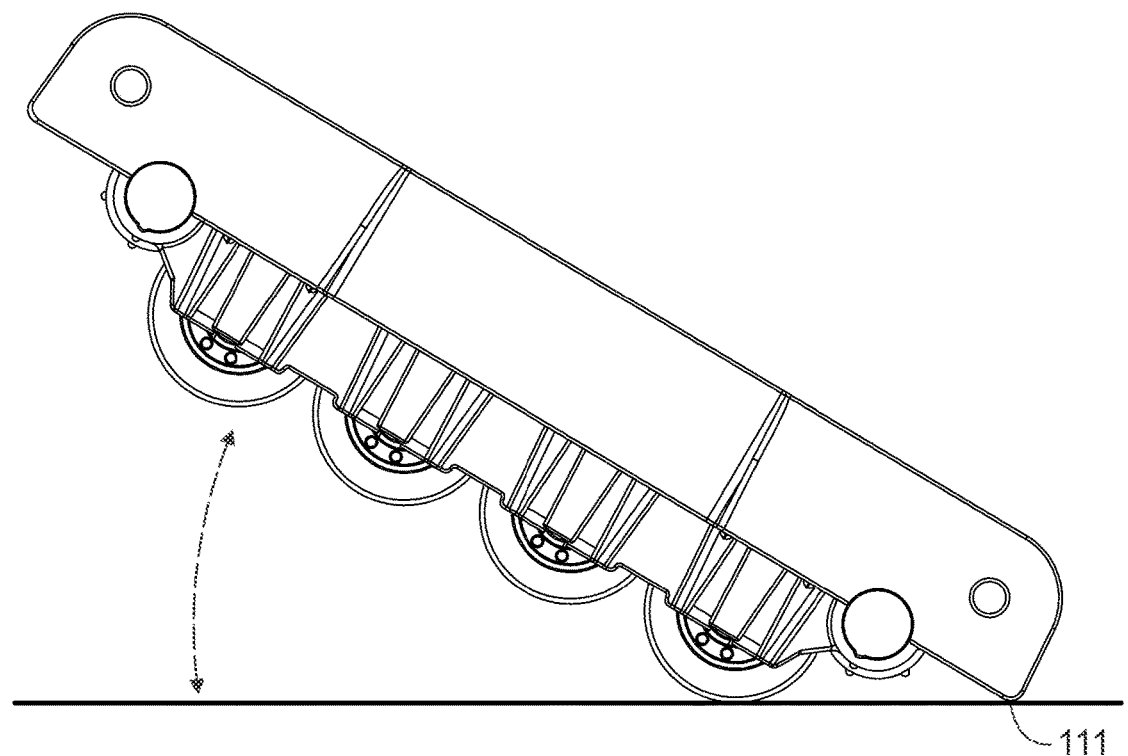
FIG. 9 illustrates a side elevation view of the dolly being tilted to its maximum extent, according to certain embodiments.

FIG. 9 depicts a side elevation view of the dolly 100 at its maximum tilt angle, which is indicated by the curved broken line. Tilting can be advantageous when loading or unloading the load onto or off of the dolly 100. The dolly 100 can be tilted either from the front or back. When tilted, only one wheel 141 on each skate 110 maintains contact on the resting surface (e.g., the ground). The maximum tilting angle is determined by the orientation of a stopping portion 111. As shown, the stopping portion 111 is the trailing (or leading) edge of a skate 110, but the stopping portion 111 could be located elsewhere. The arrangement of the forward-most (or rearward-most) wheel 141 and the stopping portion 111 can determine the maximum tilting angle for the dolly 100. Such an angle could be one selected from the range between 1-45 degrees, such as about 30 degrees. In one exemplary dolly 100, the following dimensions result in a maximum tilting angle of 30 degrees.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A dolly, comprising:
   a first skate connected to a plurality of wheels, and including at least one receiving region;
   a second skate connected to a plurality of wheels, and including an outer lateral surface and at least one receiving region having a corresponding at least one aperture through the outer lateral surface; and
   at least one rod connected to the first skate and the second skate to couple the first skate with the second skate,
   wherein,
   the at least one rod is connected to the first skate via a corresponding one of the at least one receiving region of the first skate,
   the at least one rod is connected to the second skate via a corresponding one of the at least one receiving region of the second skate,
   the at least one rod is configured to extend through a corresponding one of the at least one aperture through the outer lateral surface of the second skate by a variable amount,
   the at least one rod is secured to the first skate, such that when the first rod is secured to the first skate, the relative positions of the first rod and the first skate do not change, and
   the at least one rod is not secured to the second skate.

2. The dolly of claim 1, wherein,
   the at least one rod comprises a first rod and a second rod,
   the at least one receiving region comprises a first and a second receiving region, and
   the at least one aperture through an outer lateral surface of the second skate comprises a first aperture and a second aperture.

3. The dolly of claim 1, further comprising at least one end cap connected to a corresponding one of the at least one rod, wherein the at least one end cap prevents the second skate from separating from the at least one rod.

4. The dolly of claim 1, wherein the at least one rod has an adjustable length.

5. The dolly of claim 4, wherein the at least one rod is telescoping.

6. The dolly of claim 1, wherein the at least one rod is configured to be selectively disconnected from the first skate and the second skate.

7. The dolly of claim 1, wherein:
the first skate comprises a horizontally-oriented surface configured to receive a load and a wall extending upwardly above the horizontally-oriented surface in a vertical dimension, wherein the wall is configured to prevent the load from extending past an outer lateral extent of the first skate; and
the second skate comprises a horizontally-oriented surface configured to receive the load and a wall extending upwardly above the horizontally-oriented surface in a vertical dimension, wherein the wall is configured to prevent the load from extending past an outer lateral extent of the second skate.

8. The dolly of claim 1, wherein the dolly includes at least one stopping portion, and wherein the at least one stopping portion determines a maximum angle that the dolly can be tilted, and wherein the dolly is configured to be tilted to tilt the load, and wherein only one of the plurality of first wheels and only one of the plurality of second wheels maintain contact on a resting surface when the dolly is tilted.

9. The dolly of claim 1, wherein the at least one rod is not positioned between any two wheels of the plurality of wheels of the first skate, and wherein the at least one rod is not positioned between any two wheels of the plurality of wheels of the second skate.

10. A dolly, comprising:
a first skate connected to a plurality of wheels, and including a first receiving region and a second receiving region;
a second skate connected to a plurality of wheels, and including a first receiving region and a second receiving region, and including a first aperture and a second aperture, wherein each of the first aperture and the second aperture extends through an outer lateral surface of the second skate;
a first rod maintained in a perpendicular orientation to the first skate via the first receiving region of the first skate, and maintained in a perpendicular orientation to the second skate via the first receiving region of the second skate; and
a second rod maintained in a perpendicular orientation to the first skate via the second receiving region of the first skate, and maintained in a perpendicular orientation to the second skate via the second receiving region of the second skate,
wherein,
the first rod is configured to extend by a variable length through the first aperture through the outer lateral surface of the second skate,
the second rod is configured to extend by a variable length through the second aperture through the outer lateral surface of the second skate,
the first rod is securable to the first skate, such that when the first rod is secured to the first skate, the relative positions of the first rod and the first skate do not change,
the second rod is securable to the first skate, such that when the second rod is secured to the first skate, the relative positions of the second rod and the first skate do not change,
the first rod is not secured to the second skate, and
the second rod is not secured to the second skate.

11. The dolly of claim 10, further comprising:
a first end cap connected to the first rod, such that the first end cap prevents the second skate from separating from the first rod; and
a second end cap connected to the second rod, such that the second end cap prevents the second skate from separating from the second rod.

12. The dolly of claim 11, wherein the first end cap is selectively disconnectable from the first rod, and the second end cap is selectively disconnectable from the second rod.

13. The dolly of claim 10, wherein the first rod has an adjustable length, and the second rod has an adjustable length.

14. The dolly of claim 13, wherein the first rod is telescoping, and the second rod is telescoping.

15. The dolly of claim 10, wherein the first rod is configured to be selectively disconnected from the first skate and the second skate, and the second rod is configured to be selectively disconnected from the first skate and the second skate.

16. The dolly of claim 10, wherein:
the first skate comprises a horizontally-oriented surface configured to receive a load and a wall extending upwardly above the horizontally-oriented surface in a vertical dimension, wherein the wall is configured to prevent the load from extending past an outer lateral extent of the first skate; and
the second skate comprises a horizontally-oriented surface configured to receive the load and a wall extending upwardly above the horizontally-oriented surface in a vertical dimension, wherein the wall is configured to prevent the load from extending past an outer lateral extent of the second skate.

17. The dolly of claim 10, wherein the dolly includes at least one stopping portion, and wherein the at least one stopping portion determines a maximum angle that the dolly can be tilted, and wherein the dolly is configured to be tilted to tilt the load, and wherein only one of the plurality of first wheels and only one of the plurality of second wheels maintain contact on a resting surface when the dolly is tilted.

18. The dolly of claim 10, wherein the first rod is not positioned between any two wheels of the plurality of wheels of the first skate, wherein the first rod is not positioned between any two wheels of the plurality of wheels of the second skate, wherein the second rod is not positioned between any two wheels of the plurality of wheels of the first skate, wherein the second rod is not positioned between any two wheels of the plurality of wheels of the second skate.

* * * * *